(12) United States Patent
Li

(10) Patent No.: US 11,227,182 B2
(45) Date of Patent: Jan. 18, 2022

(54) METHOD, APPARATUS, AND STORAGE MEDIUM FOR RECOGNIZING IMAGE OBJECT

(71) Applicant: TENCENT TECHNOLOGY (SHENZHEN) COMPANY LIMITED, Shenzhen (CN)

(72) Inventor: Ruiyu Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/927,202

(22) Filed: Jul. 13, 2020

(65) Prior Publication Data
US 2020/0342253 A1  Oct. 29, 2020

Related U.S. Application Data

(63) Continuation of application No. PCT/CN2019/078517, filed on Mar. 18, 2019.

(30) Foreign Application Priority Data

Apr. 16, 2018 (CN) .......................... 201810338448.2

(51) Int. Cl.
*G06K 9/62* (2006.01)
*G06K 9/46* (2006.01)
(Continued)

(52) U.S. Cl.
CPC ............. *G06K 9/6202* (2013.01); *G06K 9/46* (2013.01); *G06K 9/6256* (2013.01); *G06N 3/02* (2013.01);
(Continued)

(58) Field of Classification Search
CPC ...... G06K 9/6202; G06K 9/46; G06K 9/6256; G06K 2009/6213; G06K 9/6273;
(Continued)

(56) References Cited

U.S. PATENT DOCUMENTS 9,665,802 B2   5/2017  Wang et al.
2004/0208375 A1  10/2004  Gupta et al.
(Continued)

FOREIGN PATENT DOCUMENTS

CN   103020173 A  *  4/2013
CN   103020173 A     4/2013
(Continued)

OTHER PUBLICATIONS

Jiang et al., "A memory model for image recognition and classification based on convolutional neural network and Bayesian decision" with English abstract translation, College of Information and Control Engineering, China University of Petroleum, Qingdao, China, Sci Sin Tech, Sep. 20, 2017, 9 pages.
(Continued)

*Primary Examiner* — Nay A Maung
*Assistant Examiner* — Daniella M. DiGuglielmo
(74) *Attorney, Agent, or Firm* — Crowell & Moring LLP

(57) ABSTRACT

The present disclosure describes methods, devices, and storage medium for recognizing a target object in a target image. The method including obtaining, by a device, an image recognition instruction, the image recognition instruction carrying object identification information used for indicating a target object in a target image. The device includes a memory storing instructions and a processor in communication with the memory. The method includes obtaining, by the device, an instruction feature vector matching the image recognition instruction; obtaining, by the device, an image feature vector set matching the target image, the
(Continued)

image feature vector set comprising an $i^{th}$ image feature vector for indicating an image feature of the target image in an $i^{th}$ scale, and i being a positive integer; and recognizing, by the device, the target object from the target image according to the instruction feature vector and the image feature vector set.

17 Claims, 8 Drawing Sheets

(51) Int. Cl.
    *G06N 3/02* (2006.01)
    *G06N 3/04* (2006.01)
    *G06N 3/08* (2006.01)

(52) U.S. Cl.
    CPC ......... *G06N 3/0445* (2013.01); *G06N 3/0454* (2013.01); *G06N 3/08* (2013.01); *G06K 9/6273* (2013.01); *G06K 2009/6213* (2013.01); *G06N 3/0481* (2013.01)

(58) Field of Classification Search
    CPC ...... G06N 3/02; G06N 3/0481; G06N 3/0454; G06N 3/0445; G06N 3/08
    USPC .......................................................... 382/157
    See application file for complete search history.

(56) References Cited

U.S. PATENT DOCUMENTS

| | | | |
|---|---|---|---|
| 2004/0234136 A1 | 11/2004 | Zhu et al. | |
| 2016/0140424 A1* | 5/2016 | Wang | G06K 9/52 382/156 |
| 2018/0039853 A1* | 2/2018 | Liu | G06K 9/72 |

FOREIGN PATENT DOCUMENTS

| | | | |
|---|---|---|---|
| CN | 103824067 A | * | 5/2014 |
| CN | 103824067 A | | 5/2014 |
| CN | 104331711 A | | 2/2015 |
| CN | 104809726 A | | 7/2015 |
| CN | 105354579 A | * | 2/2016 |
| CN | 105354579 A | | 2/2016 |
| CN | 105469052 A | | 4/2016 |
| CN | 105808610 A | | 7/2016 |
| CN | 106548145 A | | 3/2017 |
| CN | 107657249 A | | 2/2018 |
| CN | 107798292 A | | 3/2018 |
| CN | 108681743 A | | 10/2018 |

OTHER PUBLICATIONS

Zhang et al., "Image multi-scale recognition method based on computer vision" with English abstract translation, School of Mechanical Engineering, Shenyang, China and State Grid Yingkou Electric Power Supply Company, Yingkou, China, Journal of Computer Applications, Feb. 10, 2015, 5 pages.

International Search Report with English translation and Written Opinion regarding PCT/CN2019/078517 dated May 31, 2019, 9 pages.

Office Action with concise translation regarding 2018103384482 dated Jul. 29, 2019.

Office Action with concise translation regarding 2018103384482 dated Sep. 19, 2019.

* cited by examiner

METHOD, APPARATUS, AND STORAGE MEDIUM FOR RECOGNIZING IMAGE OBJECT

RELATED APPLICATION

This application is a continuation application of PCT Patent Application No. PCT/CN2019/078517, filed on Mar. 18, 2019, which claims priority to Chinese Patent Application No. 201810338448.2, filed with the National Intellectual Property Administration, P.R. China on Apr. 16, 2018, both of which are incorporated herein by reference in their entireties.

FIELD OF THE TECHNOLOGY

This application relates to the field of computers, and specifically, to an image object recognition method and apparatus, a storage medium, and an electronic apparatus.

BACKGROUND OF THE DISCLOSURE

To precisely process objects included in an image, increasingly more users begin to use an image processing tool application, for example, performing a manual operation in the image processing tool application, to recognize a region in which a to-be-processed target object is located in the image, thereby performing a further image processing operation on the target object in the region.

However, currently, in the image processing tool application, coarse boundary estimation is generally provided for only the region including the target object. If the boundary estimation is further interfered by information about an obscure processing instruction, information of the target object recognized from the image may be missing, thereby causing a problem of relatively low recognition accuracy of an image object.

No effective solution for the foregoing problem has been provided at present.

SUMMARY

Embodiments of this application provide an image object recognition method and apparatus, a storage medium, and an electronic apparatus, to at least resolve a technical problem of relatively low recognition accuracy of an image object caused by information missing of a recognized target object.

The present disclosure describes a method for recognizing a target object in a target image. The method including obtaining, by a device, an image recognition instruction, the image recognition instruction carrying object identification information used for indicating a target object in a target image. The device includes a memory storing instructions and a processor in communication with the memory. The method includes obtaining, by the device, an instruction feature vector matching the image recognition instruction; obtaining, by the device, an image feature vector set matching the target image, the image feature vector set comprising an ith image feature vector for indicating an image feature of the target image in an ith scale, and i being a positive integer; and recognizing, by the device, the target object from the target image according to the instruction feature vector and the image feature vector set.

The present disclosure describes an apparatus for recognizing a target object in a target image. The apparatus including a memory storing instructions; and a processor in communication with the memory. When the processor executes the instructions, the processor is configured to cause the apparatus to obtain an image recognition instruction, the image recognition instruction carrying object identification information used for indicating a target object in a target image, obtain an instruction feature vector matching the image recognition instruction, obtain an image feature vector set matching the target image, the image feature vector set comprising an ith image feature vector for indicating an image feature of the target image in an ith scale, and i being a positive integer, and recognize the target object from the target image according to the instruction feature vector and the image feature vector set.

The present disclosure describes a non-transitory computer readable storage medium storing computer readable instructions. The computer readable instructions, when executed by a processor, causing the processor to perform obtaining an image recognition instruction, the image recognition instruction carrying object identification information used for indicating a target object in a target image; obtaining an instruction feature vector matching the image recognition instruction; obtaining an image feature vector set matching the target image, the image feature vector set comprising an ith image feature vector for indicating an image feature of the target image in an ith scale, and i being a positive integer; and recognizing the target object from the target image according to the instruction feature vector and the image feature vector set.

In an optional example, the apparatus further includes: a processing unit, configured to perform an image processing operation on the target object after the target object is recognized from the target image. The image processing operation includes at least one of the following operations: cropping the target object, and editing the target object.

According to still another aspect of the embodiments of this application, a storage medium is further provided, the storage medium storing a computer program, the computer program, when being run, being configured to perform the foregoing image object recognition method.

According to still another aspect of the embodiments of this application, an electronic apparatus is further provided, including a memory, a processor, and a computer program stored in the memory and executable by the processor, the processor performing the foregoing image object recognition method by using the computer program.

In the embodiments of this application, after obtaining an image recognition instruction for recognizing a to-be-recognized target object in a target image, the client obtains an instruction feature vector matching the image recognition instruction and an image feature vector set matching the target image, an $i^{th}$ image feature vector included in the image feature vector set being used for indicating an image feature of the target image in an $i^{th}$ scale, to recognize the target object according to the obtained instruction feature vector and image feature vector set. In other words, in a process of recognizing the target object in the target image according to the image recognition instruction, the client fuses the instruction feature vector matching the image recognition instruction with image feature vectors in different scales corresponding to the target image, and no longer merely performs coarse boundary estimation. Therefore, information missing of the recognized target object is avoided, thereby improving accuracy of the recognized target object, and further overcoming the problem of relatively low recognition accuracy of an image object in the related art.

BRIEF DESCRIPTION OF THE DRAWINGS

The accompanying drawings described herein are used for providing further understanding for this application and constitute a part of this application. Exemplary embodiments of this application and descriptions thereof are used for explaining this application and do not constitute an improper limitation to this application. In the accompanying drawings.

DESCRIPTION OF EMBODIMENTS

To make a person skilled in the art better understand solutions of this application, the following clearly and completely describes the technical solutions in embodiments of this application with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

In the specification, claims, and accompanying drawings of this application, the terms "first", "second", and so on are intended to distinguish between similar objects rather than indicating a specific order. It is to be understood that the data termed in such a way is interchangeable in proper circumstances, so that the embodiments of this application described herein can be implemented in other orders than the order illustrated or described herein. Moreover, the terms "include", "contain" and any other variations mean to cover the non-exclusive inclusion. For example, a process, method, system, product, or device that includes a list of operations or units is not necessarily limited to those expressly listed steps or units, but may include other steps or units not expressly listed or inherent to such a process, method, system, product, or device.

Figure 1:
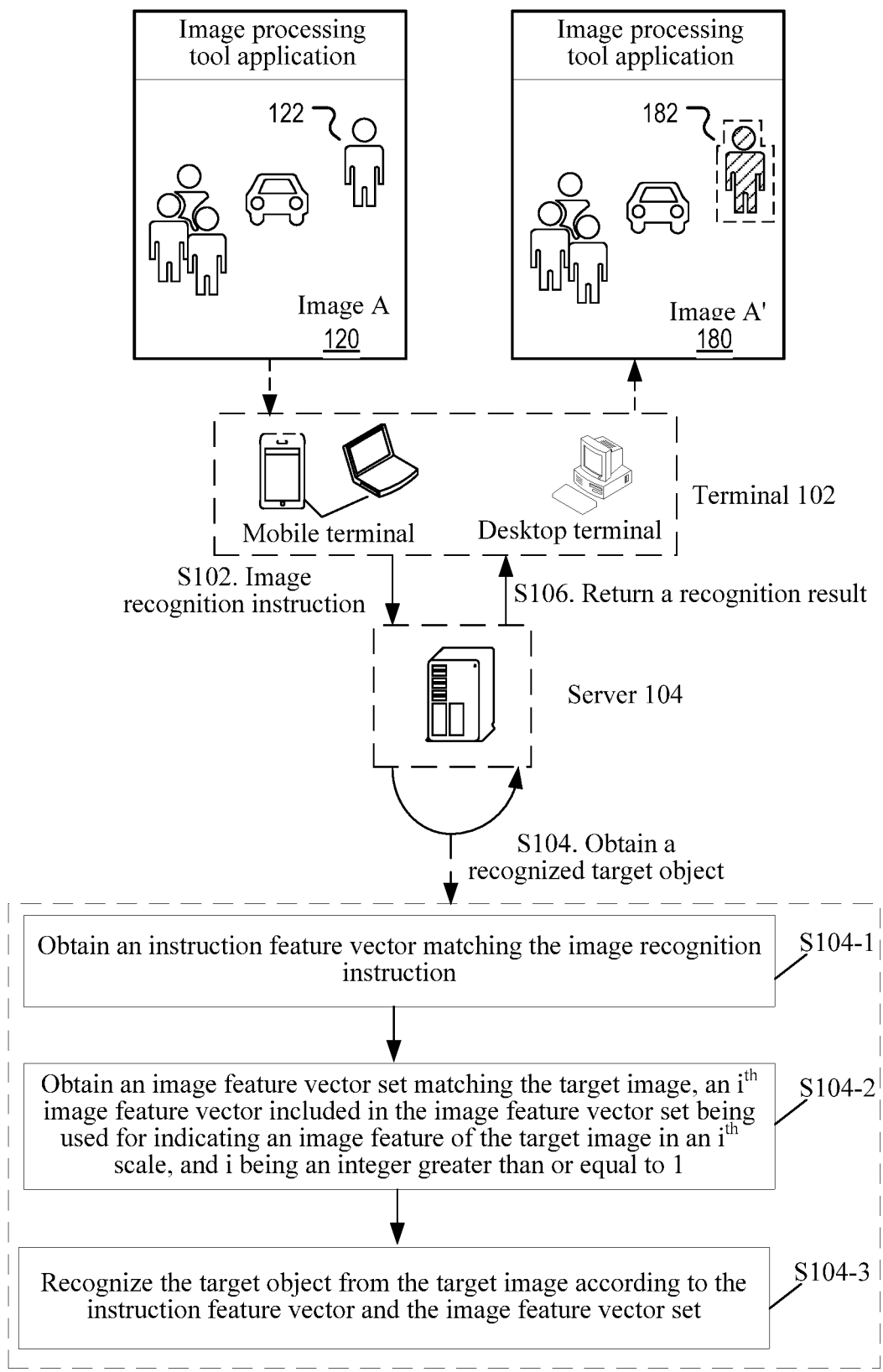
FIG. 1 is a schematic diagram of a hardware environment of an optional image object recognition method according to an embodiment of this application.

In the embodiments of this application, an embodiment of the foregoing image object recognition method is provided. In an optional implementation, the image object recognition method may be applied to, but is not limited to, a hardware environment shown in FIG. 1. In an image processing tool application installed on a terminal 102, as described in step S102, the image processing tool application obtains an image recognition instruction for recognizing a target object in a target image. Assuming that the target image is an image A 120 shown at the upper left corner of FIG. 1, a target object indicated by object identification information carried in the image recognition instruction is a figure object 122 located on the right side of an automobile shown in FIG. 1. A server 104 obtains a recognized target object as described in step S104 by performing step S104-1 to step S104-3, and returns a recognition result to the terminal 102 as described in step S106. An image A' 180 as shown at the upper right corner of FIG. 1 may be displayed in the terminal 102. A figure object filled with shadows in a dashed-line region 182 in the image A' is the recognized target object. As described in step S104-1 to step S104-3, after obtaining the image recognition instruction, the server 104 obtains an instruction feature vector matching the image recognition instruction, and an image feature vector set matching the target image, an $i^{th}$ image feature vector included in the image feature vector set being used for indicating an image feature of the target image in an $i^{th}$ scale; and recognizes the target object from the target image according to the obtained instruction feature vector and image feature vector set.

In this embodiment, in a process of recognizing the target object in the target image according to the image recognition instruction, the instruction feature vector matching the image recognition instruction is fused with image feature vectors in different scales corresponding to the target image. It is no longer merely performing coarse boundary estimation. Therefore, information missing of the recognized target object is avoided, thereby improving accuracy of the recognized target object, and further overcoming the problem of relatively low recognition accuracy of an image object in the related art.

Optionally, in this embodiment, the foregoing terminal 102 may include, but is not limited to: a mobile terminal and a desktop terminal, such as a mobile phone, a tablet computer, a notebook computer, a desktop personal computer (PC), a digital television, and other hardware devices configured to recognize an image object for image processing. The terminal 102 may exchange data with the server 104 by using a network. The network may include, but is not limited to: a wireless network and a wired network. The wired network includes, but is not limited to, at least one of the following: a wide area network, a metropolitan area network, and a local area network. The wireless network includes, but is not limited to, at least one of the following: Bluetooth, Wi-Fi, and near field communication (NFC). The foregoing is merely an example, and is not limited in this embodiment.

Figure 2:
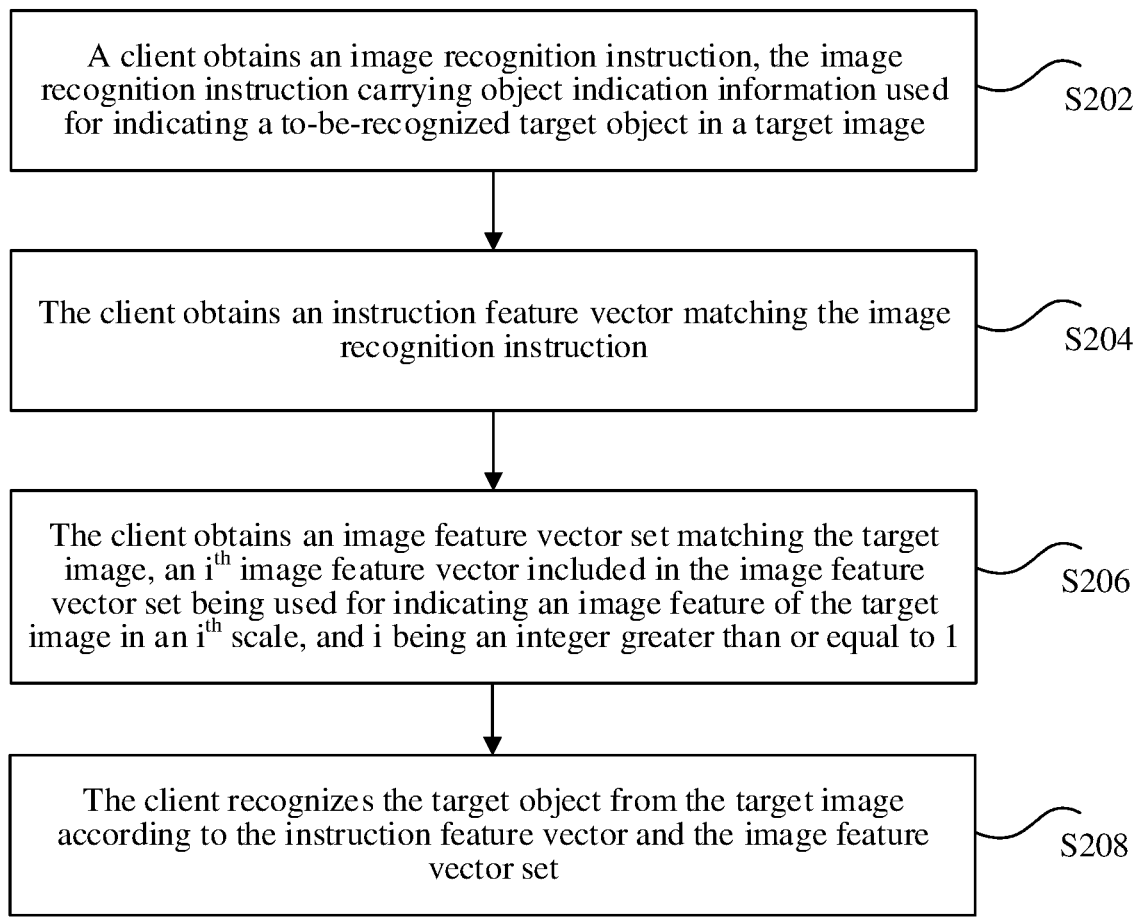
FIG. 2 is a flowchart of an optional image object recognition method according to an embodiment of this application.

According to an aspect of the embodiments of this application, an image object recognition method is provided. As shown in FIG. 2, the method includes the following steps:

S202. A client obtains an image recognition instruction, the image recognition instruction carrying object indication information used for indicating a to-be-recognized target object in a target image. The object indication information may be object identification information.

S204. The client obtains an instruction feature vector matching the image recognition instruction.

S206. The client obtains an image feature vector set matching the target image, an $i^{th}$ image feature vector included in the image feature vector set being used for indicating an image feature of the target image in an $i^{th}$ scale, and i being an integer greater than or equal to 1.

S208. The client recognizes the target object from the target image according to the instruction feature vector and the image feature vector set.

Optionally, in this embodiment, the image object recognition method may be applied to, but is not limited to, an image processing process. The image processing process herein may be, but is not limited to, being implemented by a client run on a terminal. The client may include, but is not limited to, a static image processing tool application and a dynamic image processing tool application. The dynamic image processing tool application may be, but is not limited to, dynamic image processing, video image frame processing, or the like. The image processing process may include at least one of the following operations: cropping the target object and editing the target object. For example, in an image A' shown at the upper right corner of FIG. 1, if a figure object filled with shadows in a dashed-line region in the image A' 180 is a recognized target object, image processing may be further performed on the target object. For example, the target object is cropped from the image A', and further image optimization processing is performed, for example, changing image parameters such as brightness and contrast. The foregoing is merely an example, and is not limited in this embodiment.

In this embodiment, after obtaining the image recognition instruction for recognizing the to-be-recognized target object in the target image, the client fuses the instruction feature vector matching the image recognition instruction with image feature vectors in different scales corresponding to the target image, and no longer merely performs coarse boundary estimation. Therefore, information missing of the recognized target object is avoided, thereby improving accuracy of the recognized target object.

Optionally, in this embodiment, the image feature of the target image in the $i^{th}$ scale may be used for indicating an image feature obtained by performing an $i^{th}$ iteration on the target image in a neural network model, but is not limited thereto. The image feature of the target image in the $i^{th}$ scale corresponds to an image feature obtained by scaling the target image proportionally. For example, an image feature of a target image whose size is W×H in the $i^{th}$ scale may be represented by using an image feature of an image obtained after the target image whose size is W×H is scaled to be an image whose size is $w_i \times h_i$, but is not limited thereto.

Optionally, in this embodiment, the object identification information in the image recognition instruction may include, but is not limited to, a location of the target object in the target image. For example, the location of the target object may be marked by using coordinate locations of pixel points in the target image. The foregoing is merely an example, and this embodiment is not limited thereto.

Optionally, in this embodiment, the obtaining, by a client, an image recognition instruction may be, but is not limited to:

1) obtaining, by the client, an image recognition instruction of a voice input; and 2) obtaining, by the client, an image recognition instruction of a keystroke input by using an input plug-in disposed in the application client.

In this embodiment, the client may obtain the image recognition instruction in other manners. An obtaining operation of obtaining an image recognition instruction may be simplified, and moreover, obtaining manners may be enriched, so as to increase a download amount of the application client.

Optionally, in this embodiment, the client may perform semantic learning on the image recognition instruction by using a neural network model or the like, to extract the instruction feature vector. The neural network model may be, but is not limited to, a long short-term memory (LSTM) network model. The neural network model may be obtained by training a plurality of sample image recognition instructions, but is not limited thereto.

Optionally, in this embodiment, the image feature vector set includes a target image feature vector and a change image feature vector. The target image feature vector may be, but is not limited to, an image feature vector finally obtained through a first neural network model, and the change image feature vector may be, but is not limited to, T variable image feature vectors obtained through a second neural network model. For example, T variable image feature vectors in a change image feature vector m may be expressed as $m = \{m_1, m_2, \ldots, m_T\}$, where $m_t$ is used for representing an image feature of the target image in a $t^{th}$ scale, and $1 \leq t \leq T$. Each vector element included in $m_t$ is used for indicating image feature information on a pixel point r after a size of the target image is scaled to $w_t \times h_t$.

The first neural network model and the second neural network model may be different neural network models, or may be the same neural network model, such as a convolutional neural network (CNN) model.

For example, assuming that the first neural network model and the second neural network model are both CNN models, the target image feature vector may include, but is not limited to, a variable image feature vector corresponding to a $T^{th}$ scale in the change image feature vector. For another example, assuming that the first neural network model and the second neural network model are both CNN models, the target image feature vector may alternatively include, but is not limited to, an image feature vector corresponding to a scale beyond the change image feature vector. For example, a target image feature vector in an $I^{th}$ scale may be an image feature vector obtained after a $T^{th}$ variable image feature vector.

Optionally, in this embodiment, that the client recognizes the target object from the target image according to the instruction feature vector and the image feature vector set may include, but is not limited to: determining, by the client according to the instruction feature vector and the target image feature vector in the image feature vector set, an object feature vector matching the object identification information, the object feature vector being used for indicating a location of the to-be-recognized target object in the target image; and recognizing, by the client, the target object from the target image according to the object feature vector and the change image feature vector in the image feature vector set.

In this embodiment, that the client obtains the object feature vector may include, but is not limited to: obtaining, by the client, a coordinate vector matching the target image; splicing, by the client, the instruction feature vector, the target image feature vector, and the coordinate vector, to obtain a spliced feature vector; and inputting the spliced feature vector into a corresponding neural network model, to obtain the object feature vector.

Optionally, in this embodiment, the recognizing, by the client, the target object from the target image according to the object feature vector and the change image feature vector in the image feature vector set may include, but is not limited to: inputting, by the client, the object feature vector as an initial feature vector into a third neural network model, and sequentially inputting, in each iteration process, intermediate image feature vectors determined according to the variable image feature vectors included in the change image feature vector. Therefore, in a process of recognizing an image object, image features of the target image in different scales are fused, to avoid a problem of relatively low recognition accuracy of the image object caused by coarse boundary estimation. The third neural network model may be, but is not limited to, a convolutional LSTM model.

In addition, a gate-controlled iteration structure, or the like may be used in the third neural network model, such as an input control gate, a forget control gate, and an output control gate. Therefore, the image features of the target image in different scales are accurately captured by adaptively choosing to forget previous information or fusing with new information in each iteration.

Figure 3:
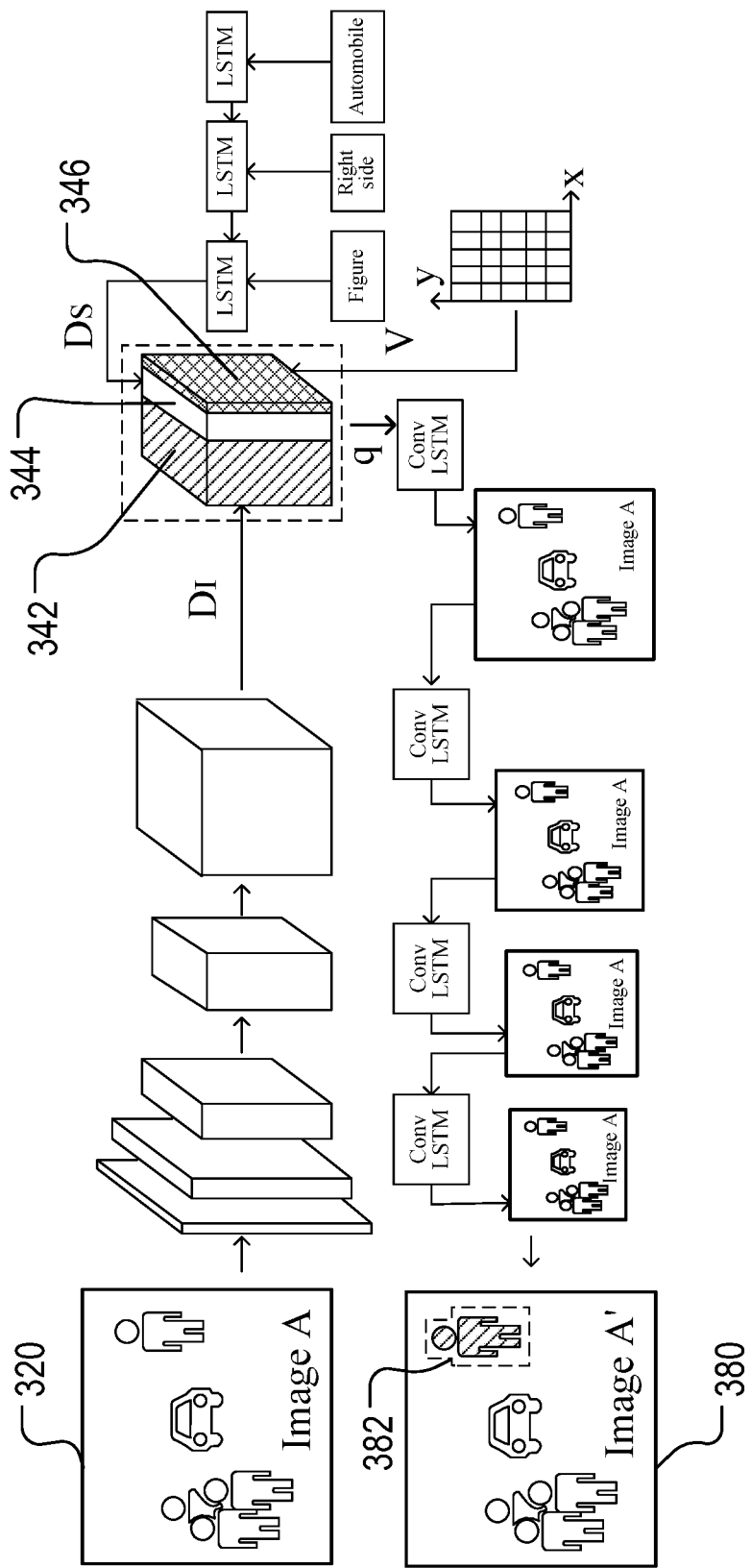
FIG. 3 is a schematic diagram of an optional image object recognition method according to an embodiment of this application.

Details are described with reference to the following example. As shown in FIG. 3, it is assumed that the target image is an image A 320 whose size is W×H. The client obtains an image recognition instruction for the image A 320, and learns, through word segmentation and semantic recognition, that the image recognition instruction indicates that a figure object located on the right side of an automobile in the image A is a to-be-recognized target object. An instruction feature vector S matching the image recognition instruction is obtained through an LSTM, and a vector length is represented by $D_S$. An image feature vector set is obtained through a CNN. A target image feature vector is I, and a vector length is represented by $D_I$. A change image feature vector is m, and T variable image feature vectors included in the change image feature vector m may be expressed as $m=\{m_1, m_2, \ldots, m_T\}$, where $m_t$ is used for representing an image feature of the target image in a $t^{th}$ scale, and $1 \leq t \leq T$. A coordinate vector V corresponding to the target image (the image A) is obtained, and V herein may be, but is not limited to, a coordinate location of a key pixel in the image A, for example, x-axis and y-axis coordinates of a central point, x-axis and y-axis coordinates of an upper left corner, or x-axis and y-axis coordinates of a lower right corner.

Assuming that an image size corresponding to a target image feature vector finally obtained through a plurality of iterations (a plurality of rectangles shown in FIG. 3) is w×h, the client expresses the target image feature vector by using the following expression: $w \times h \times D_I$, and splices the target image feature vector (a rectangle filled with oblique lines 342 shown in FIG. 3), the instruction feature vector (a blank or un-filled rectangle 344 shown in FIG. 3), and a coordinate vector (a rectangle filled with grids 346 shown in FIG. 3) corresponding to the image A, to obtain a spliced feature vector, which is expressed by using the following expression: $w \times h \times (D_I + D_S + V)$. The spliced feature vector is imported into a CNN network model. An object feature vector q may be obtained through one 1×1 convolutional layer, and is expressed by using the following expression: $w \times h \times D_Q$.

The object feature vector is an initial estimate of a region in which the target object is located in the image A. To improve accuracy of object recognition, in this embodiment, variable image feature vectors of the image A in different scales are obtained. As shown in a lower part of FIG. 3, the object feature vector q is inputted as an initial feature vector, and then intermediate image feature vectors (represented by images with different scaling sizes shown in FIG. 3) corresponding to the variable image feature vectors in different scales are sequentially inputted into a ConvLSTM neural model, thereby obtaining an accurately recognized target object, that is, a figure object filled with shadows in a dashed-line region 382 in Image A' 380 shown in FIG. 3.

According to this embodiment of this application, after obtaining the image recognition instruction for recognizing the to-be-recognized target object in the target image, the client fuses the instruction feature vector matching the image recognition instruction with image feature vectors in different scales corresponding to the target image, and no longer merely performs coarse boundary estimation. Therefore, information missing of the recognized target object is avoided, thereby improving accuracy of the recognized target object.

In an optional solution, the recognizing, by the client, the target object from the target image according to the instruction feature vector and the image feature vector set includes the following steps:

S1. The client obtains a target image feature vector in the image feature vector set, the target image feature vector being used for indicating an image feature vector of the target image finally obtained through a first neural network model, and the first neural network model being obtained through machine training by using a plurality of first sample images.

S2. The client obtains a change image feature vector in the image feature vector set, the change image feature vector including T variable image feature vectors of the target image obtained through a second neural network model, the second neural network model being obtained through machine training by using a plurality of second sample images, and T being an integer greater than or equal to 1.

S3. The client determines, according to the instruction feature vector and the target image feature vector, an object feature vector matching the object identification information.

S4. The client recognizes the target object from the target image according to the object feature vector and the change image feature vector.

Optionally, in this embodiment, the first neural network model and the second neural network model may be different neural network models, or may be the same neural network model, such as a convolutional neural network (CNN) model.

For example, assuming that the first neural network model and the second neural network model are both CNN models, the target image feature vector may include, but is not limited to, a variable image feature vector corresponding to a $T^{th}$ scale in the change image feature vector. In addition, the target image feature vector may alternatively include, but is not limited to, an image feature vector corresponding to a scale beyond the change image feature vector. For example, a target image feature vector in an $I^{th}$ scale may be an image feature vector obtained after a $T^{th}$ variable image feature vector.

Figure 4:
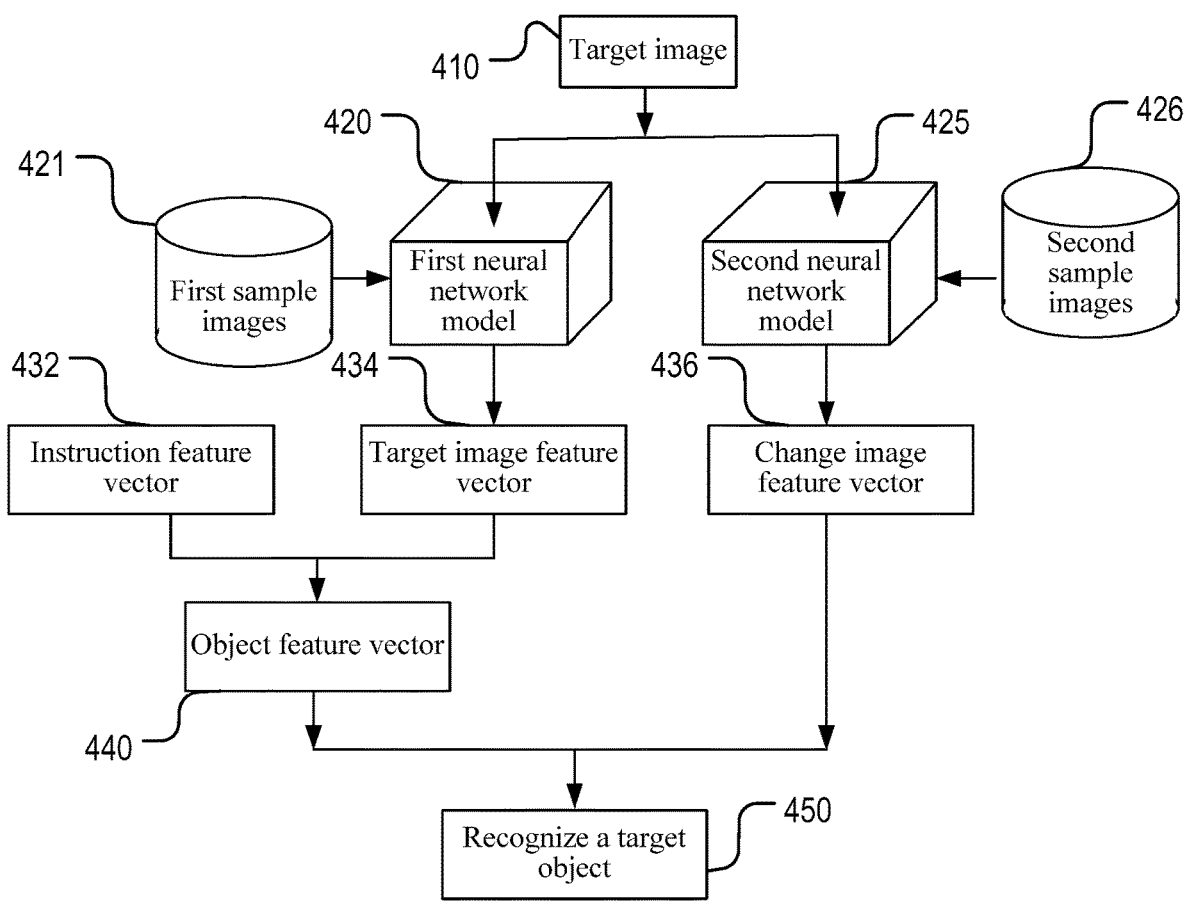
FIG. 4 is a schematic diagram of another optional image object recognition method according to an embodiment of this application.

For another example, as shown in FIG. 4, assuming that the first neural network model 420 and the second neural network model 425 are different neural network models, a target image feature vector 434 of the target image 410 is finally obtained by using the first neural network model, where the first neural network model is obtained by performing machine training on a plurality of first sample images 421. A change image feature vector 436 of the target image is obtained by using the second neural network model, and the change image feature vector includes T variable image feature vectors in T scales, where the second neural network model is obtained by performing machine training on a plurality of second sample images 426. An object feature vector 440 matching the object identification information may be determined according to the instruction feature vector 432 and the target image feature vector 434. Further, the recognized target object 450 is obtained according to the determined object feature vector and the T variable image feature vectors included in the change image feature vector.

According to this embodiment provided in this application, a method in which the client determines the object feature vector matching the object identification information by using the instruction feature vector and the target image feature vector is used. The object feature vector may be used for roughly estimating the region in which the target object is located, and is further combined with the variable image feature vectors in the change image feature vector. Therefore, image features of the target image in different scales are fused into an image object recognition process, thereby overcoming a problem of relatively low recognition accuracy caused by coarse boundary estimation provided in the related art, and further improving the recognition accuracy.

In an optional solution, that the client recognizes the target object from the target image according to the object feature vector and the change image feature vector includes the following steps:

S1. The client obtains a vector parameter of the object feature vector.

S2. The client scales the variable image feature vectors included in the change image feature vector according to the vector parameter, and performs a conversion operation on the scaled change image feature vector, to obtain T intermediate image feature vectors.

S3. The client inputs the object feature vector as an initial feature vector into a third neural network model, and sequentially inputs the T intermediate image feature vectors into the third neural network model, the third neural network model being obtained through machine training by using a plurality of third sample images.

S4. The client determines, according to an output result finally outputted by the third neural network model, a target region that matches the object identification information and that is in the target image.

S5. The client recognizes the target object from the target region.

Optionally, in this embodiment, the vector parameter may include, but is not limited to, a vector dimension and a vector length. The foregoing is merely an example, and this embodiment further includes other vector-related parameters. This is not limited in this embodiment.

Details are described with reference to the following example. As shown in FIG. 3, it is assumed that the target image is an image A whose size is W×H. The client obtains an image recognition instruction for the image A, and learns, through word segmentation and semantic recognition, that the image recognition instruction indicates that a figure object located on the right side of an automobile in the image A is a to-be-recognized target object. An instruction feature vector S matching the image recognition instruction is obtained through an LSTM, and a vector length is represented by $D_S$. An image feature vector set is obtained through a CNN. A target image feature vector is I, and a vector length is represented by $D_I$. A change image feature vector is m, and T variable image feature vectors included in the change image feature vector m may be expressed as m={$m_1, m_2, \ldots, m_T$}, where $m_t$ is used for representing an image feature of the target image in a $t^{th}$ scale, and $1 \le t \le T$. It is determined that an object feature vector is q according to the instruction feature vector and the target image feature vector, and the object feature vector is expressed by using the following expression: $w \times h \times D_Q$.

The T variable image feature vectors are scaled, so that the scaled variable image feature vectors have the same size as the object feature vector q. For example, a variable image feature vector $m_t$ is used as an example for description, and an expression of the variable image feature vector $m_t$ may be $w_t \times h_t \times D_T$. $D_T$ is used for representing a vector length of a vector corresponding to image feature information on a pixel point r in the variable image feature vector $m_t$ in a $t^{th}$ scale, and r is a natural number greater than or equal to 1 and less than or equal to a total quantity of pixel points in the target image. The foregoing size $w_t \times h_t$ is adjusted to w×h through scaling, and the vector length $D_T$ is adjusted to $D_Q$. For example, vector dimension raising processing is performed. Therefore, dimension information of the scaled variable image feature vector may also be expressed by using the following expression: $w \times h \times D_Q$. Further, the scaled variable image feature vectors are inputted into one 1×1 convolutional layer, to obtain intermediate image feature vectors, such as {$x_1, x_2, \ldots, x_T$}, which corresponds to {$m_1, m_2, \ldots, m_T$}.

A ConvLSTM is used to perform a loop iteration on the object feature vector q. The object feature vector q is used as an initial hidden variable $h_0$ of the ConvLSTM, and a hidden variable $c_0$ is configured as an all-zero vector. In a $t^{th}$ iteration process of the ConvLSTM, a combination process of a hidden variable $h_{t-1}$ and an input $x_t$ may be as follows:

$$i_t = \sigma(V_i x_t + U_i h_{t-1} + b_i) \quad (1)$$

$$f_t = \sigma(V_f x_t + U_f h_{t-1} + b_f) \quad (2)$$

$$c_t = f_t \circ c_{t-1} + i_t \circ \tanh(V_c x_t + U_c h_{t-1} + b_c) \quad (3)$$

$$o_t = \sigma(V_o x_t + U_o h_{t-1} + b_o) \quad (4)$$

$$h_t = o_t \circ \tanh(c_t) \quad (5)$$

σ refers to a sigmoid function, and ° represents Hadamard multiplication. $c_t$ is an intermediate hidden variable of the ConvLSTM. $i_t$, $f_t$, and $o_t$ are an input control gate, a forget control gate, and an output control gate respectively. The three control gates may effectively select information to be reserved and input information to be fused from history information. V, U, and b are all parameters of a convolutional operation. The parameters may be determined through machine training. After the last iteration, a hidden variable $h_T$ has been fused with image information in a plurality of scales. In this embodiment, a probability p of a target region in which the target object matching the object identification information is located may be determined according to $h_T$, thereby accurately recognizing the target object from the target region.

According to this embodiment provided in this application, the client fuses the object feature vector with the variable image feature vectors in different scales, thereby combining image features of the target image in different scales, to further improve recognition accuracy.

In an optional solution, the determining, by the client according to an output result finally outputted by the third neural network model, a target region that matches the object identification information and that is in the target image includes the following steps:

S1. The client obtains, according to the output result, a probability vector matching the target image, a $j^{th}$ probability element in the probability vector being used for indicating a probability that a $j^{th}$ pixel location in the target image is located in the target region, and j being an integer greater than or equal to 1.

S2. The client obtains a target probability element indicating a probability greater than a threshold from the probability vector. In one implementation, there may be at least one target probability element indicating a probability greater than a threshold from the probability vector.

S3. The client determines the target region according to a pixel location indicated by the target probability element in the target image. In one implementation, the target region accords to at least one pixel location indicated by the at least one target probability element.

Details are described with reference to the following example. In this embodiment, probabilities of pixel locations in the target image being in the target region where the target object is located may be determined by using a sigmoid function, or the like. For example, a probability vector matching the target image may be determined according to an output result outputted by the third neural network model, and a formula is as follows:

$$p=\text{sigmoid}(W_p h_T + b_p) \quad (6)$$

$W_p$ and $b_p$ are parameters that have been configured. The probabilities of the pixel locations in the target image being in the target region where the target object is located may be accurately obtained according to the foregoing formula.

Figure 5:
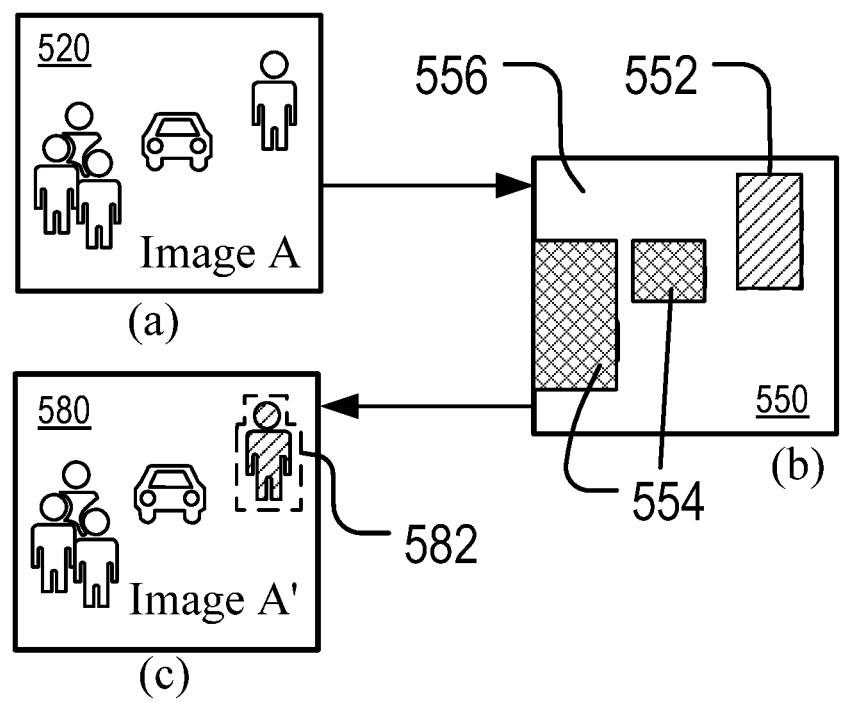
FIG. 5 is a schematic diagram of still another optional image object recognition method according to an embodiment of this application.

For example, as shown in FIG. 5, it is assumed that the threshold is 0.5, and the target image is an image A 520. Further, it is assumed that an image 550 shows probabilities indicated by probability elements in a probability vector. For example, a blank region 556 indicates that a probability is 0, a grid region 554 indicates that a probability is 0.1 to 0.3, and an oblique line region 552 indicates that a probability is greater than 0.5. Therefore, it may be determined that the target region is the oblique line region, and a target object is recognized from the target region, that is, a figure object filled with shadows in a dashed-line region 582 in an image 580 as shown in FIG. 5.

According to this embodiment provided in this application, the client obtains the probability vector matching the target image by using the output result of the neural network model, thereby determining, according to the probability in the probability vector, the target region in which the target object is located, so that the target object is accurately recognized from the target image.

In an optional solution, before the client inputs the object feature vector as the initial feature vector into the third neural network model, the method further includes the following step:

S1. The client trains the third neural network model according to the plurality of third sample images, a target value matching a training input value of the third neural network model and a training output value outputted by the third neural network model being obtained in a process of training the third neural network model; and performs adjustment processing on the third neural network model according to the target value and the training output value by using a loss function.

The target value may be, but is not limited to, a reference output value matching the training input value that is simultaneously obtained with the training input value. In a process of training the neural network model, p may be, but is not limited to being, enlarged to a size of W×H the same as that of the target image by using bilinear interpolation, and is adjusted and optimized by using the following loss function:

$$L = -\frac{1}{WH}\sum_{i=1}^{W}\sum_{j=1}^{H}(y_{ij}\log(p_{ij}) + (1 - y_{ij})\log(1 - p_{ij})) \quad (7)$$

$p_{ij}$ is used for representing a probability element in the probability vector, $y_{ij}$ is used for representing the target value, and W and H are used for identifying the size of the target image.

In a neural network model training process, parameters in the neural network model are dynamically adjusted by using the foregoing formula, to ensure accuracy of the neural network model.

According to this embodiment provided in this application, the client adjusts and optimizes the third neural network model by using the loss function, to ensure accuracy and applicability of the third neural network model. Therefore, accuracy of the probability vector obtained by using the third neural network model is ensured, to improve recognition accuracy of an image object.

In an optional solution, that the client determines, according to the instruction feature vector and the target image feature vector, an object feature vector matching the object identification information includes the following steps:

S1. The client obtains a coordinate vector matching the target image.

S2. The client splices the instruction feature vector, the target image feature vector, and the coordinate vector, to obtain a spliced feature vector.

S3. The client inputs the spliced feature vector into a fourth neural network model, to obtain the object feature vector, the fourth neural network model being obtained through machine training by using a plurality of sample objects.

Details are described by using the following example. Assuming that the image recognition instruction is a natural language description S, a size of the target image is W×H, S is encoded by using an LSTM, and a hidden variable s of the last iteration of the LSTM after regularization of L2 is used as an instruction feature vector. A vector length of the instruction feature vector is $D_S$. A target image feature vector $D_I$ included in a change image feature vector and a coordinate vector V corresponding to an image A are obtained. As shown in FIG. 3, the target image feature vector (a rectangle filled with oblique lines shown in FIG. 3), the instruction feature vector (a blank rectangle shown in FIG. 3), and a coordinate vector (a rectangle filled with grids shown in FIG. 3) corresponding to the image A are spliced, to obtain a spliced feature vector, which is expressed by using the following expression: w×h×($D_I+D_S+V$). The spliced feature vector is imported into a CNN network model. An object feature vector q may be obtained through one 1×1 convolutional layer, and is expressed by using the following expression: w×h×$D_Q$.

According to this embodiment provided in this application, the client splices the instruction feature vector matching the target image, the target image feature vector, and the coordinate vector matching the target image, to obtain the spliced feature vector, and inputs the spliced feature vector into the fourth neural network model, thereby estimating the object feature vector matching the object identification information.

For simple descriptions, the foregoing method embodiments are stated as a series of action combinations. However, it is to be appreciated by a person skilled in the art that this application is not limited to the sequence of the described actions because according to this application, some steps may be performed in another sequence or simultaneously. Secondarily, it is also to be appreciated by a person skilled in the art that the embodiments described in the specification all belong to optional embodiments and the related actions and modules are not mandatory to this application.

According to the descriptions in the foregoing implementations, a person skilled in the art may clearly understand that the method according to the foregoing embodiments may be implemented by software and a necessary general hardware platform or by hardware, but in many cases, the former is a better implementation. Based on such an understanding, the technical solutions of this application essentially or the part contributing to the related art may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in the embodiments of this application.

Figure 6:
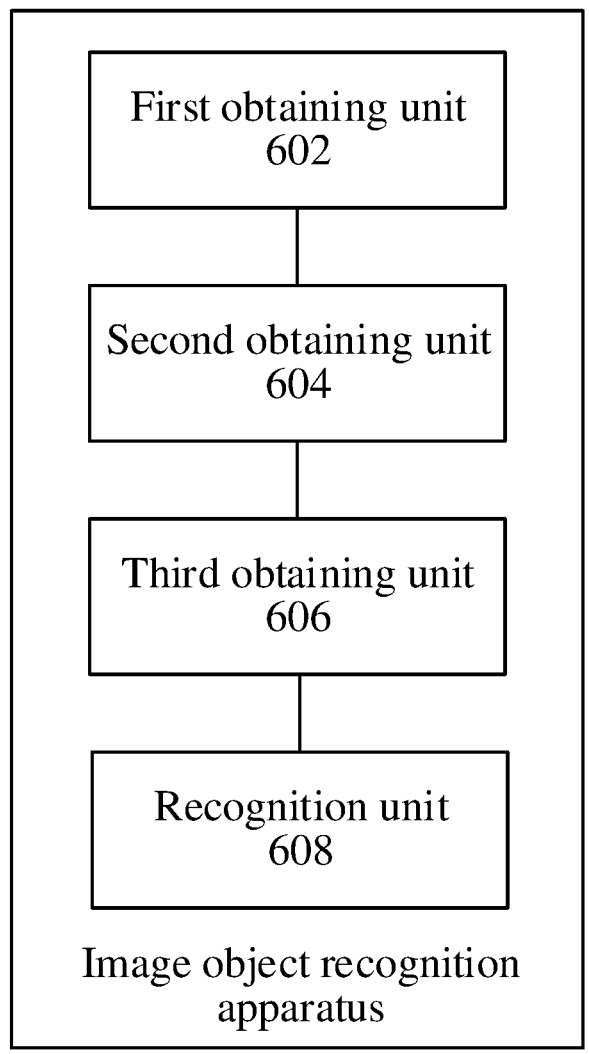
FIG. 6 is a schematic diagram of an optional image object recognition apparatus according to an embodiment of this application.

According to another aspect of the embodiments of this application, an image object recognition apparatus for implementing the foregoing image object recognition method is further provided. A client is run on the apparatus. As shown in FIG. 6, the apparatus includes:

1) a first obtaining unit 602, configured to obtain an image recognition instruction, the image recognition instruction carrying object identification information used for indicating a to-be-recognized target object in a target image;

2) a second obtaining unit 604, configured to obtain an instruction feature vector matching the image recognition instruction;

3) a third obtaining unit 606, configured to obtain an image feature vector set matching the target image, an $i^{th}$ image feature vector included in the image feature vector set being used for indicating an image feature of the target image in an $i^{th}$ scale, and i being an integer greater than or equal to 1; and 4) a recognition unit 608, configured to recognize the target object from the target image according to the instruction feature vector and the image feature vector set.

Optionally, in this embodiment, the image object recognition apparatus may be applied to, but is not limited to, an image processing process. The image processing process herein may be implemented by using a client run on the apparatus, but is not limited thereto. The client may include, but is not limited to, a static image processing tool application and a dynamic image processing tool application. The dynamic image processing tool application may be, but is not limited to, dynamic image processing, video image frame processing, or the like. The image processing process may include at least one of the following operations: cropping the target object and editing the target object. For example, in an image A' shown at the upper right corner of FIG. 1, if a figure object filled with shadows in a dashed-line region in the image A' is a recognized target object, image processing may be further performed on the target object. For example, the target object is cropped from the image A', and further image optimization processing is performed, for example, changing image parameters such as brightness and contrast. The foregoing is merely an example, and this embodiment is not limited thereto.

In this embodiment, after obtaining the image recognition instruction for recognizing the to-be-recognized target object in the target image, the instruction feature vector matching the image recognition instruction is fused with image feature vectors in different scales corresponding to the target image. It is no longer merely performing coarse boundary estimation. Therefore, information missing of the recognized target object is avoided, thereby improving accuracy of the recognized target object.

Optionally, in this embodiment, the apparatus further includes: a processing unit, configured to perform an image processing operation on the target object after the target object is recognized from the target image. The image processing operation includes at least one of the following operations: cropping the target object, and editing the target object.

Optionally, in this embodiment, the image feature of the target image in the $i^{th}$ scale may be used for indicating an image feature obtained by performing an $i^{th}$ iteration on the target image in a neural network model, but is not limited thereto. The image feature of the target image in the $i^{th}$ scale corresponds to an image feature obtained by scaling the target image proportionally. For example, an image feature of a target image whose size is W×H in the $i^{th}$ scale may be represented by using an image feature of an image obtained after the target image whose size is W×H is scaled to be an image whose size is $w_i \times h_i$, but is not limited thereto.

Optionally, in this embodiment, the object identification information in the image recognition instruction may include, but is not limited to, a location of the target object in the target image. For example, the location of the target object may be marked by using coordinate locations of pixel points in the target image. The foregoing is merely an example, and this embodiment is not limited thereto.

Optionally, in this embodiment, the obtaining an image recognition instruction may be, but is not limited to:

1) obtaining an image recognition instruction of a voice input; and 2) obtaining an image recognition instruction of a keystroke input by using an input plug-in disposed in the application client.

In this embodiment, the image recognition instruction may be obtained in other manners. An obtaining operation of obtaining an image recognition instruction may be simplified, and moreover, obtaining manners may be enriched, so as to increase a download amount of the application client.

Optionally, in this embodiment, an operation of performing semantic learning on the image recognition instruction by using a neural network model, or other operations may be used, to extract the instruction feature vector. The neural network model may be, but is not limited to, a long short-term memory (LSTM) network model. The neural network model may be obtained by training a plurality of sample image recognition instructions, but is not limited thereto.

Optionally, in this embodiment, the image feature vector set includes a target image feature vector and a change image feature vector. The target image feature vector may be, but is not limited to, an image feature vector finally obtained through a first neural network model, and the change image feature vector may be, but is not limited to, T variable image feature vectors obtained through a second neural network model. For example, T variable image feature vectors in a change image feature vector m may be expressed as $m = \{m_1, m_2, \ldots, m_T\}$, where $m_t$ is used for representing an image feature of the target image in a $t^{th}$ scale, and $1 \le t \le T$. Each vector element included in $m_t$ is used for indicating image feature information on a pixel point r after a size of the target image is scaled to $w_t \times h_t$.

The first neural network model and the second neural network model may be different neural network models, or may be the same neural network model, such as a convolutional neural network (CNN) model.

For example, assuming that the first neural network model and the second neural network model are both CNN models, the target image feature vector may include, but is not limited to, a variable image feature vector corresponding to a $T^{th}$ scale in the change image feature vector. For another example, assuming that the first neural network model and the second neural network model are both CNN models, the target image feature vector may alternatively include, but is not limited to, an image feature vector corresponding to a scale beyond the change image feature vector. For example, a target image feature vector in an $I^{th}$ scale may be an image feature vector obtained after a $T^{th}$ variable image feature vector.

Optionally, in this embodiment, the recognizing the target object from the target image according to the instruction feature vector and the image feature vector set may include, but is not limited to: determining, according to the instruction feature vector and the target image feature vector in the image feature vector set, an object feature vector matching the object identification information, the object feature vector being used for indicating a location of the to-be-recognized target object in the target image; and recognizing the target object from the target image according to the object feature vector and the change image feature vector in the image feature vector set.

In this embodiment, the obtaining the object feature vector may include, but is not limited to: obtaining a coordinate vector matching the target image; splicing the instruction feature vector, the target image feature vector, and the coordinate vector, to obtain a spliced feature vector; and inputting the spliced feature vector into a corresponding neural network model, to obtain the object feature vector.

Optionally, in this embodiment, the recognizing the target object from the target image according to the object feature vector and the change image feature vector in the image feature vector set may include, but is not limited to: inputting the object feature vector as an initial feature vector into a third neural network model, and sequentially inputting, in each iteration process, intermediate image feature vectors determined according to the variable image feature vectors included in the change image feature vector. Therefore, in a process of recognizing an image object, image features of the target image in different scales are fused, to avoid a problem of relatively low recognition accuracy of the image object caused by coarse boundary estimation. The third neural network model may be, but is not limited to, a convolutional LSTM model.

In addition, a gate-controlled iteration structure, or the like may be used in the third neural network model, such as an input control gate, a forget control gate, and an output control gate. Therefore, the image features of the target image in different scales are accurately captured by adaptively choosing to forget previous information or fusing with new information in each iteration.

Details are described with reference to the following example. As shown in FIG. 3, it is assumed that the target image is an image A whose size is W×H. An image recognition instruction for the image A is obtained, and it is learned, through word segmentation and semantic recognition, that the image recognition instruction indicates that a figure object located on the right side of an automobile in the image A is a to-be-recognized target object. An instruction feature vector S matching the image recognition instruction is obtained through an LSTM, and a vector length is represented by $D_S$. An image feature vector set is obtained through a CNN. A target image feature vector is I, and a vector length is represented by $D_I$. A change image feature vector is m, and T variable image feature vectors included in the change image feature vector m may be expressed as $m=\{m_1, m_2, \ldots, m_T\}$, where $m_t$ is used for representing an image feature of the target image in a $t^{th}$ scale, and $1 \le t \le T$. A coordinate vector V corresponding to the target image (the image A) is obtained, and V herein may be, but is not limited to, a coordinate location of a key pixel in the image A, for example, x-axis and y-axis coordinates of a central point, x-axis and y-axis coordinates of an upper left corner, or x-axis and y-axis coordinates of a lower right corner.

Assuming that an image size corresponding to a target image feature vector finally obtained through a plurality of iterations (a plurality of rectangles shown in FIG. 3) is w×h, the target image feature vector is expressed by using the following expression: $w \times h \times D_I$, and the target image feature vector (a rectangle filled with oblique lines shown in FIG. 3), the instruction feature vector (a blank rectangle shown in FIG. 3), and a coordinate vector (a rectangle filled with grids shown in FIG. 3) corresponding to the image A are spliced, to obtain a spliced feature vector, which is expressed by using the following expression: $w \times h \times (D_I + D_S + V)$. The spliced feature vector is imported into a CNN network model. An object feature vector q may be obtained through one 1×1 convolutional layer, and is expressed by using the following expression: $w \times h \times D_Q$.

The object feature vector is an initial estimate of a region in which the target object is located in the image A. To improve accuracy of object recognition, in this embodiment, variable image feature vectors of the image A in different scales are obtained. As shown in a lower part of FIG. 3, the object feature vector q is inputted as an initial feature vector, and then intermediate image feature vectors (represented by images with different scaling sizes shown in FIG. 3) corresponding to the variable image feature vectors in different scales are sequentially inputted into a ConvLSTM neural model, thereby obtaining an accurately recognized target object, that is, a figure object filled with shadows in a dashed-line region shown in FIG. 3.

According to this embodiment of this application, after obtaining the image recognition instruction for recognizing the to-be-recognized target object in the target image, the instruction feature vector matching the image recognition instruction is fused with image feature vectors in different scales corresponding to the target image. It is no longer merely performing coarse boundary estimation. Therefore, information missing of the recognized target object is avoided, thereby improving accuracy of the recognized target object.

Figure 7:
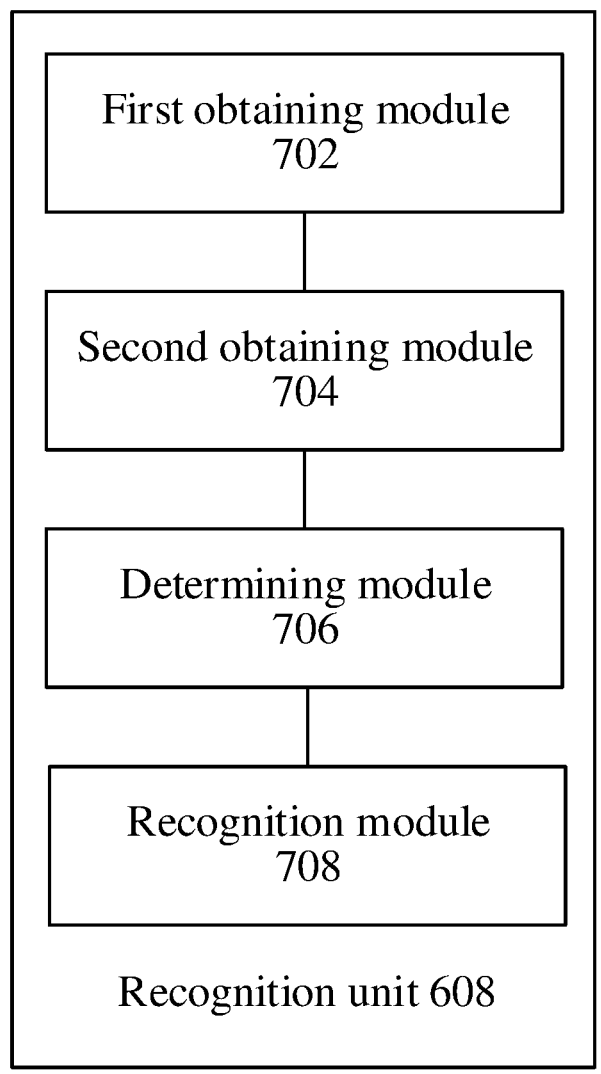
FIG. 7 is a schematic diagram of another optional image object recognition apparatus according to an embodiment of this application.

In an optional solution, as shown in FIG. 7, the recognition unit 608 includes:

1) a first obtaining module 702, configured to obtain a target image feature vector in the image feature vector set, the target image feature vector being used for indicating an image feature vector of the target image finally obtained through a first neural network model, and the first neural network model being obtained through machine training by using a plurality of first sample images;

2) a second obtaining module 704, configured to obtain a change image feature vector in the image feature vector set, the change image feature vector including T variable image feature vectors of the target image obtained through a second neural network model, the second neural network model being obtained through machine training by using a plurality of second sample images, and T being an integer greater than or equal to 1;

3) a determining module 706, configured to determine, according to the instruction feature vector and the target image feature vector, an object feature vector matching the object identification information; and 4) a recognition module 708, configured to recognize the target object from the target image according to the object feature vector and the change image feature vector.

Optionally, in this embodiment, the first neural network model and the second neural network model may be different neural network models, or may be the same neural network model, such as a convolutional neural network (CNN) model.

For example, assuming that the first neural network model and the second neural network model are both CNN models, the target image feature vector may include, but is not limited to, a variable image feature vector corresponding to a $T^{th}$ scale in the change image feature vector. In addition, the target image feature vector may alternatively include, but is not limited to, an image feature vector corresponding to a scale beyond the change image feature vector. For example, a target image feature vector in an $I^{th}$ scale may be an image feature vector obtained after a $T^{th}$ variable image feature vector.

For another example, as shown in FIG. 4, assuming that the first neural network model and the second neural network model are different neural network models, a target image feature vector of the target image is finally obtained by using the first neural network model, where the first neural network model is obtained by performing machine training on a plurality of first sample images. A change image feature vector of the target image is obtained by using the second neural network model, and the change image feature vector includes T variable image feature vectors in T scales, where the second neural network model is obtained by performing machine training on a plurality of second sample images. An object feature vector matching the object identification information may be determined according to the instruction feature vector and the target image feature vector. Further, the recognized target object is obtained according to the determined object feature vector and the T variable image feature vectors included in the change image feature vector.

According to this embodiment provided in this application, the object feature vector matching the object identification information is determined by using the instruction feature vector and the target image feature vector, the object feature vector may be used for roughly estimating the region in which the target object is located, and is further combined with the variable image feature vectors in the change image feature vector. Therefore, image features of the target image in different scales are fused into an image object recognition process, thereby overcoming a problem of relatively low recognition accuracy caused by coarse boundary estimation provided in the related art, and further improving the recognition accuracy.

In an optional solution, the recognition module includes:

1) a first obtaining submodule, configured to obtain a vector parameter of the object feature vector;

2) a calculation submodule, configured to scale the variable image feature vectors included in the change image feature vector according to the vector parameter, and perform a conversion operation on the scaled change image feature vector, to obtain T intermediate image feature vectors;

3) a first input submodule, configured to input the object feature vector as an initial feature vector into a third neural network model, and sequentially input the T intermediate image feature vectors into the third neural network model, the third neural network model being obtained through machine training by using a plurality of third sample images;

4) a determining submodule, configured to determine, according to an output result finally outputted by the third neural network model, a target region that matches the object identification information and that is in the target image; and 5) a recognition submodule, configured to recognize the target object from the target region.

Optionally, in this embodiment, the vector parameter may include, but is not limited to, a vector dimension and a vector length. The foregoing is merely an example, and this embodiment further includes other vector-related parameters. This is not limited in this embodiment.

Details are described with reference to the following example. As shown in FIG. 3, it is assumed that the target image is an image A whose size is W×H. An image recognition instruction for the image A is obtained, and it is learned, through word segmentation and semantic recognition, that the image recognition instruction indicates that a figure object located on the right side of an automobile in the image A is a to-be-recognized target object. An instruction feature vector S matching the image recognition instruction is obtained through an LSTM, and a vector length is represented by $D_S$. An image feature vector set is obtained through a CNN. A target image feature vector is I, and a vector length is represented by $D_I$. A change image feature vector is m, and T variable image feature vectors included in the change image feature vector m may be expressed as m={$m_1, m_2, \ldots, m_T$}, where $m_t$ is used for representing an image feature of the target image in a $t^{th}$ scale, and 1≤t≤T. It is determined that an object feature vector is q according to the instruction feature vector and the target image feature vector, and the object feature vector is expressed by using the following expression: w×h×$D_Q$.

The T variable image feature vectors are scaled, so that the scaled variable image feature vectors have the same size as the object feature vector q. For example, a variable image feature vector $m_t$ is used as an example for description, and an expression of the variable image feature vector $m_t$ may be $w_t×h_t×D_T$. $D_T$ is used for representing a vector length of a vector corresponding to image feature information on a pixel point r in the variable image feature vector $m_t$ in a $t^{th}$ scale, and r is a natural number greater than or equal to 1 and less than or equal to a total quantity of pixel points in the target image. The foregoing size $w_t×h_t$ is adjusted to w×h through scaling, and the vector length $D_T$ is adjusted to $D_Q$. For example, vector dimension raising processing is performed. Therefore, dimension information of the scaled variable image feature vector may also be expressed by using the following expression: w×h×$D_Q$. Further, the scaled variable image feature vectors are inputted into one 1×1 convolutional layer, to obtain intermediate image feature vectors, such as {$x_1, x_2, \ldots, x_T$}, which corresponds to {$m_1, m_2, \ldots, m_T$}.

A ConvLSTM is used to perform a loop iteration on the object feature vector q. The object feature vector q is used as an initial hidden variable $h_0$ of the ConvLSTM, and a hidden variable $c_0$ is configured as an all-zero vector. In a $t^{th}$ iteration process of the ConvLSTM, a combination process of a hidden variable $h_{t-1}$ and an input $x_t$ may be as follows:

$$i_t = \sigma(V_i x_t + U_i h_{t-1} + b_i) \quad (8)$$

$$f_t = \sigma(V_f x_t + U_f h_{t-1} + b_f) \quad (9)$$

$$c_t = f_t \circ c_{t-1} + i_t \circ \tanh(V_c x_t + U_c h_{t-1} + b_c) \quad (10)$$

$$o_t = \sigma(V_o x_t + U_o h_{t-1} + b_o) \quad (11)$$

$$h_t = o_t \circ \tanh(c_t) \quad (12)$$

σ refers to a sigmoid function, and ° represents Hadamard multiplication. $c_t$ is an intermediate hidden variable of the ConvLSTM. $i_t$, $f_t$, and $o_t$ are an input control gate, a forget control gate, and an output control gate respectively. The three control gates may effectively select information to be reserved and input information to be fused from history information. V, U and b are all parameters of a convolutional operation. The parameters may be determined through machine training. After the last iteration, a hidden variable $h_T$ has been fused with image information in a plurality of scales. In this embodiment, a probability p of a target region in which the target object matching the object identification information is located may be determined according to $h_T$, thereby accurately recognizing the target object from the target region.

According to this embodiment provided in this application, the object feature vector is fused with the variable image feature vectors in different scales, thereby combining image features of the target image in different scales, to further improve recognition accuracy.

In an optional solution, the determining submodule is further configured to perform the following steps:

S1. Obtain, according to the output result, a probability vector matching the target image, a $j^{th}$ probability element in the probability vector being used for indicating a probability that a $j^{th}$ pixel location in the target image is located in the target region, and j being an integer greater than or equal to 1.

S2. Obtain a target probability element indicating a probability greater than a threshold from the probability vector.

S3. Determine the target region according to a pixel location indicated by the target probability element in the target image.

Details are described with reference to the following example. In this embodiment, probabilities of pixel locations in the target image being in the target region where the target object is located may be determined by using a sigmoid function, or the like. For example, a probability vector matching the target image may be determined according to an output result outputted by the third neural network model, and a formula is as follows:

$$p = \text{sigmoid}(W_p h_T + b_p) \quad (13)$$

$W_p$ and $b_p$ are parameters that have been configured. The probabilities of the pixel locations in the target image being in the target region where the target object is located may be accurately obtained according to the foregoing formula.

For example, as shown in FIG. 5, it is assumed that the threshold is 0.5, and the target image is an image A shown in FIG. 5(a). Further, it is assumed that FIG. 5(b) shows probabilities indicated by probability elements in a probability vector. For example, a blank region indicates that a probability is 0, a grid region indicates that a probability is 0.1 to 0.3, and an oblique line region indicates that a probability is greater than 0.5. Therefore, it may be determined that the target region is the oblique line region, and a target object is recognized from the target region, that is, a figure object filled with shadows in a dashed-line region shown in FIG. 5(c).

According to this embodiment provided in this application, the probability vector matching the target image is obtained by using the output result of the neural network model, thereby determining, according to the probability in the probability vector, the target region in which the target object is located, so that the target object is accurately recognized from the target image.

In an optional solution, the recognition module further includes:

1) a training submodule, configured to train the third neural network model according to the plurality of third sample images before the object feature vector is inputted as the initial feature vector into the third neural network model, a target value matching a training input value of the third neural network model and a training output value outputted by the third neural network model being obtained in a process of training the third neural network model; and perform adjustment processing on the third neural network model according to the target value and the training output value by using a loss function.

The target value may be, but is not limited to, a reference output value matching the training input value that is simultaneously obtained with the training input value. In a process of training the neural network model, p may be, but is not limited to being, enlarged to a size of W×H the same as that of the target image by using bilinear interpolation, and is adjusted and optimized by using the following loss function:

$$L = -\frac{1}{WH} \sum_{i=1}^{W} \sum_{j=1}^{H} (y_{ij} \log(p_{ij}) + (1 - y_{ij}) \log(1 - p_{ij})) \quad (14)$$

$p_{ij}$ is used for representing a probability element in the probability vector, $y_{ij}$ is used for representing the target value, and W and H are used for identifying the size of the target image.

In a neural network model training process, parameters in the neural network model are dynamically adjusted by using the foregoing formula, to ensure accuracy of the neural network model.

According to this embodiment provided in this application, the third neural network model is adjusted and optimized by using the loss function, to ensure accuracy and applicability of the third neural network model. Therefore, accuracy of the probability vector obtained by using the third neural network model is ensured, to improve recognition accuracy of an image object.

In an optional solution, the determining module further includes:

1) a second obtaining submodule, configured to obtain a coordinate vector matching the target image;

2) a splicing submodule, configured to splice the instruction feature vector, the target image feature vector, and the coordinate vector, to obtain a spliced feature vector; and 3) a second input submodule, configured to input the spliced feature vector into a fourth neural network model, to obtain the object feature vector, the fourth neural network model being obtained through machine training by using a plurality of sample objects.

Details are described by using the following example. Assuming that the image recognition instruction is a natural language description S, a size of the target image is W×H, S is encoded by using an LSTM, and a hidden variable s of the last iteration of the LSTM after regularization of L2 is used as an instruction feature vector. A vector length of the instruction feature vector is $D_S$. A target image feature vector $D_I$ included in a change image feature vector and a coordinate vector V corresponding to an image A are obtained. As shown in FIG. 3, the target image feature vector (a rectangle filled with oblique lines shown in FIG. 3), the instruction feature vector (a blank rectangle shown in FIG. 3), and a coordinate vector (a rectangle filled with grids shown in FIG. 3) corresponding to the image A are spliced, to obtain a spliced feature vector, which is expressed by using the following expression: w×h×($D_I$+$D_S$+V). The spliced feature vector is imported into a CNN network model. An object feature vector q may be obtained through one 1×1 convolutional layer, and is expressed by using the following expression: w×h×$D_Q$.

According to this embodiment provided in this application, the instruction feature vector matching the target image, the target image feature vector, and the coordinate vector matching the target image are spliced, to obtain the spliced feature vector, and the spliced feature vector is inputted into the fourth neural network model, thereby estimating the object feature vector matching the object identification information.

Figure 8:
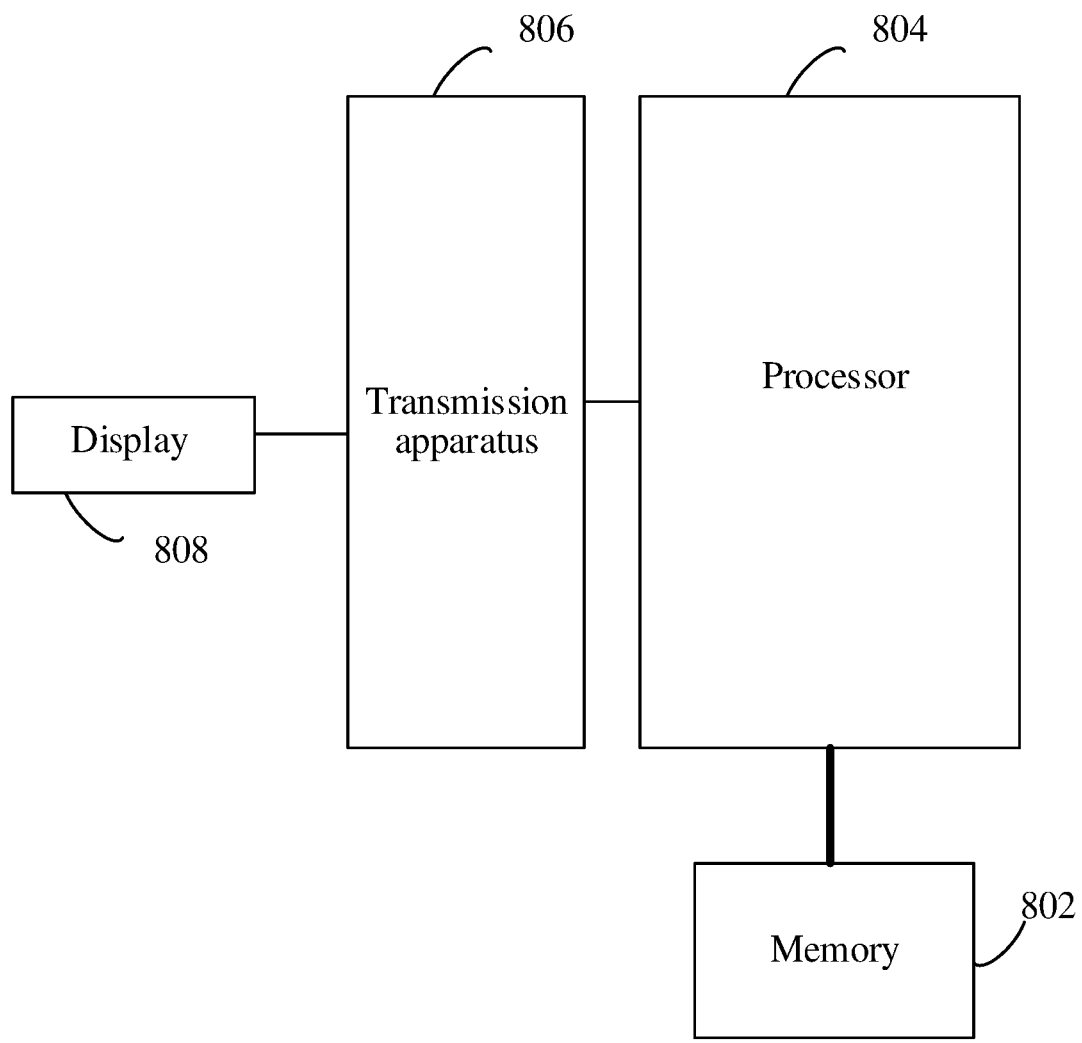
FIG. 8 is a schematic diagram of an optional electronic apparatus according to an embodiment of this application.

According to still another aspect of the embodiments of this application, an electronic apparatus for implementing the foregoing image object recognition method is further provided. As shown in FIG. 8, the electronic apparatus includes a memory 802, a processor 804, a transmission apparatus 806, and a display 808, the memory storing a computer program, and the processor being configured to perform steps in any one of the foregoing method embodiments by using the computer program.

Optionally, in this embodiment, the foregoing electronic apparatus may be located in at least one of a plurality of network devices in a computer network.

Optionally, in this embodiment, the processor may be configured to perform the following steps by using the computer program:

S1. A client obtains an image recognition instruction, the image recognition instruction carrying object identification information used for indicating a to-be-recognized target object in a target image.

S2. The client obtains an instruction feature vector matching the image recognition instruction.

S3. The client obtains an image feature vector set matching the target image, an $i^{th}$ image feature vector included in the image feature vector set being used for indicating an image feature of the target image in an $i^{th}$ scale, and i being an integer greater than or equal to 1.

S4. The client recognizes the target object from the target image according to the instruction feature vector and the image feature vector set.

Optionally, a person of ordinary skill in the art may understand that, the structure shown in FIG. 8 is only schematic. The electronic apparatus may be a terminal device such as a smartphone (such as an Android mobile phone or an iOS mobile phone), a tablet computer, a palmtop computer, a mobile Internet device (MID), or a PAD. FIG. 8 does not limit the structure of the foregoing electronic apparatus. For example, the electronic apparatus may further include more or fewer components (such as a network interface and a display apparatus) than those shown in FIG. 8, or have a configuration different from that shown in FIG. 8.

The memory 802 may be configured to store a software program and a module, for example, a program instruction/module corresponding to the image object recognition method and apparatus in the embodiments of this application, and the processor 804 performs various functional applications and data processing by running a software program and a module stored in the memory 802, that is, implementing the foregoing image object recognition method. The memory 802 may include a high-speed random access memory, and may further include a non-volatile memory, for example, one or more magnetic storage apparatuses, a flash memory, or another non-volatile solid-state memory. In some examples, the memory 802 may further include memories remotely disposed relative to the processor 804, and the remote memories may be connected to a terminal through a network. Instances of the network include, but are not limited to, the Internet, an intranet, a local area network, a mobile communications network, and a combination thereof.

The transmission apparatus 806 is configured to receive or send data through a network. Specific instances of the foregoing network may include a wired network and a wireless network. In an example, the transmission apparatus 806 includes a network interface controller (NIC). The NIC may be connected to another network device and a router by using a network cable, so as to communicate with the Internet or the local area network. In an example, the transmission apparatus 806 is a radio frequency (RF) module, which communicates with the Internet in a wireless manner.

The memory 802 is configured to store content such as an image recognition instruction, an image feature vector set, and a recognized target object.

According to still another aspect of the embodiments of this application, a storage medium is further provided, the storage medium storing a computer program, the computer program being configured to perform the steps in any one of the foregoing method embodiments when being run.

Optionally, in this embodiment, the storage medium may be configured to store a computer program used for performing the following steps:

S1. A client obtains an image recognition instruction, the image recognition instruction carrying object identification information used for indicating a to-be-recognized target object in a target image.

S2. The client obtains an instruction feature vector matching the image recognition instruction.

S3. The client obtains an image feature vector set matching the target image, an $i^{th}$ image feature vector included in the image feature vector set being used for indicating an image feature of the target image in an $i^{th}$ scale, and i being an integer greater than or equal to 1.

S4. The client recognizes the target object from the target image according to the instruction feature vector and the image feature vector set.

Optionally, in this embodiment, the storage medium may be configured to store a computer program used for performing the following steps:

S1. The client obtains a target image feature vector in the image feature vector set, the target image feature vector being used for indicating an image feature vector of the target image finally obtained through a first neural network model, and the first neural network model being obtained through machine training by using a plurality of first sample images.

S2. The client obtains a change image feature vector in the image feature vector set, the change image feature vector including T variable image feature vectors of the target image obtained through a second neural network model, the second neural network model being obtained through machine training by using a plurality of second sample images, and T being an integer greater than or equal to 1.

S3. The client determines, according to the instruction feature vector and the target image feature vector, an object feature vector matching the object identification information.

S4. The client recognizes the target object from the target image according to the object feature vector and the change image feature vector.

Optionally, in this embodiment, the storage medium may be configured to store a computer program used for performing the following steps:

S1. The client obtains a vector parameter of the object feature vector.

S2. The client scales the variable image feature vectors included in the change image feature vector according to the vector parameter, and performs a conversion operation on the scaled change image feature vector, to obtain T intermediate image feature vectors.

S3. The client inputs the object feature vector as an initial feature vector into a third neural network model, and sequentially inputs the T intermediate image feature vectors into the third neural network model, the third neural network model being obtained through machine training by using a plurality of third sample images.

S4. The client determines, according to an output result finally outputted by the third neural network model, a target region that matches the object identification information and that is in the target image.

S5. The client recognizes the target object from the target region.

Optionally, in this embodiment, the storage medium may be configured to store a computer program used for performing the following steps:

S1. The client obtains, according to the output result, a probability vector matching the target image, a $j^{th}$ probability element in the probability vector being used for indicating a probability that a $j^{th}$ pixel location in the target image is located in the target region, and j being an integer greater than or equal to 1.

S2. The client obtains a target probability element indicating a probability greater than a threshold from the probability vector.

S3. The client determines the target region according to a pixel location indicated by the target probability element in the target image.

Optionally, in this embodiment, the storage medium may be configured to store a computer program used for performing the following steps:

S1. The client trains the third neural network model according to the plurality of third sample images. During the training process of the third neural network model, a target value matching a training input value of the third neural network model is obtained; a training output value outputted by the third neural network model is obtained; and adjustment processing on the third neural network model according to the target value and the training output value is performed with using a loss function.

Optionally, in this embodiment, the storage medium may be configured to store a computer program used for performing the following steps:

S1. The client obtains a coordinate vector matching the target image.

S2. The client splices the instruction feature vector, the target image feature vector, and the coordinate vector, to obtain a spliced feature vector.

S3. The client inputs the spliced feature vector into a fourth neural network model, to obtain the object feature vector, the fourth neural network model being obtained through machine training by using a plurality of sample objects.

Optionally, the storage medium is further configured to store a computer program for performing steps included in the method in the foregoing embodiments. Details are not described again in this embodiment.

Optionally, in this embodiment, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disc, and the like.

The sequence numbers of the foregoing embodiments of this application are merely for the convenience of description, and do not imply the preference among the embodiments.

In a case that the integrated unit in the foregoing embodiments is implemented in the form of a software function unit and sold or used as an independent product, the integrated unit may be stored in the foregoing computer-readable storage medium. Based on such an understanding, the technical solution of this application essentially, or a part contributing to the related art, or all or a part of the technical solution may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, descriptions of the embodiments have different emphases. As for parts that are not described in detail in one embodiment, reference can be made to the relevant descriptions of the other embodiments.

In the several embodiments provided in this application, it is understood that the disclosed client may be implemented in other manners. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the displayed or discussed mutual couplings or direct couplings or communication connections may be implemented by using some interfaces. The indirect couplings or communication connections between units or modules may be implemented in electric or other forms.

The units described as separate parts may or may not be physically separate. Parts displayed as units may or may not be physical units, and may be located in one position, or may be distributed on a plurality of network units. Some or all of the units may be selected according to actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of software functional unit.

The above descriptions are merely optional implementations of this application, and a person of ordinary skill in the art may make various improvements and refinements without departing from the spirit of this application. All such modifications and refinements are to also be covered by this application.

INDUSTRIAL APPLICABILITY

In the embodiments of this application, after an image recognition instruction for recognizing a to-be-recognized target object in a target image is obtained, an instruction feature vector matching the image recognition instruction and an image feature vector set matching the target image are obtained, an $i^{th}$ image feature vector included in the image feature vector set being used for indicating an image feature of the target image in an $i^{th}$ scale, to recognize the target object according to the obtained instruction feature vector and image feature vector set. In other words, in a process of recognizing the target object in the target image according to the image recognition instruction, the instruction feature vector matching the image recognition instruction is fused with image feature vectors in different scales corresponding to the target image. It is no longer merely performing coarse boundary estimation. Therefore, information missing of the recognized target object is avoided, thereby improving accuracy of the recognized target object.

What is claimed is:

1. A method for recognizing a target object in a target image, the method comprising:
   obtaining, by a device comprising a memory storing instructions and a processor in communication with the memory, an image recognition instruction, the image recognition instruction carrying object identification information used for indicating a target object in a target image;
   obtaining, by the device, an instruction feature vector matching the image recognition instruction;
   obtaining, by the device, an image feature vector set matching the target image, the image feature vector set comprising an $i^{th}$ image feature vector for indicating an image feature of the target image in an $i^{th}$ scale, and i being a positive integer; and
   recognizing, by the device, the target object from the target image according to the instruction feature vector and the image feature vector set by:
      obtaining, by the device, a target image feature vector in the image feature vector set, the target image feature vector indicating an image feature vector of the target image obtained through a first neural network model, and the first neural network model being obtained through training with a plurality of first sample images,
      obtaining, by the device, a change-image feature vector in the image feature vector set, the change-image feature vector comprising T variable image feature vectors of the target image obtained through a second neural network model, the second neural network model being obtained through training with a plurality of second sample images, and T being a positive integer,
      determining, by the device according to the instruction feature vector and the target image feature vector, an object feature vector matching the object identification information, and
      recognizing, by the device, the target object from the target image according to the object feature vector and the change-image feature vector.

2. The method according to claim 1, wherein the recognizing the target object from the target image according to the object feature vector and the change-image feature vector comprises:
   obtaining, by the device, a vector parameter of the object feature vector;
   scaling, by the device, each variable image feature vector in the change-image feature vector according to the vector parameter, and performing a conversion operation on the scaled change-image feature vector, to obtain T intermediate image feature vectors;
   inputting, by the device, the object feature vector as an initial feature vector into a third neural network model, the third neural network model being obtained through training with a plurality of third sample images;
   inputting, by the device, the T intermediate image feature vectors sequentially into the third neural network model;
   determining, by the device according to an output result from the third neural network model, a target region that matches the object identification information and is in the target image; and
   recognizing, by the device, the target object from the target region.

3. The method according to claim 2, wherein the determining, by the device according to the output result from the third neural network model, the target region comprises:
   obtaining, by the device according to the output result, a probability vector matching the target image, the probability vector comprising a $j^{th}$ probability element indicating a probability that a $j^{th}$ pixel location in the target image is in the target region, and j being a positive integer;
   obtaining, by the device, at least one target probability element indicating a probability greater than a threshold from the probability vector; and
   determining, by the device, the target region according to at least one pixel location indicated by the at least one target probability element in the target image.

4. The method according to claim 2, wherein before the inputting the object feature vector as the initial feature vector into the third neural network model, the method further comprises:
   training, by the device, the third neural network model according to the plurality of third sample images by:
      obtaining a target value matching a training input value of the third neural network model and a training output value outputted by the third neural network model, and
      adjusting the third neural network model according to the target value and the training output value by using a loss function.

5. The method according to claim 1, wherein the determining, by the device according to the instruction feature vector and the target image feature vector, the object feature vector matching the object identification information comprises:
   obtaining, by the device, a coordinate vector matching the target image;
   splicing, by the device, the instruction feature vector, the target image feature vector, and the coordinate vector, to obtain a spliced feature vector; and
   inputting, by the device, the spliced feature vector into a fourth neural network model, to obtain the object feature vector, the fourth neural network model being obtained through training with a plurality of sample objects.

6. The method according to claim 1, wherein after the recognizing, by the device, the target object from the target image, the method further comprises:
   performing, by the device, an image processing operation on the target object, the image processing operation comprising at least one of the following operations:
   a cropping operation on the target object, or
   an editing operation on the target object.

7. An apparatus for recognizing a target object in a target image, the apparatus comprising:
a memory storing instructions; and
a processor in communication with the memory, wherein, when the processor executes the instructions, the processor is configured to cause the apparatus to:
obtain an image recognition instruction, the image recognition instruction carrying object identification information used for indicating a target object in a target image,
obtain an instruction feature vector matching the image recognition instruction,
obtain an image feature vector set matching the target image, the image feature vector set comprising an $i^{th}$ image feature vector for indicating an image feature of the target image in an $i^{th}$ scale, and i being a positive integer, and
recognize the target object from the target image according to the instruction feature vector and the image feature vector set by:
obtaining a target image feature vector in the image feature vector set, the target image feature vector indicating an image feature vector of the target image obtained through a first neural network model, and the first neural network model being obtained through training with a plurality of first sample images,
obtaining a change-image feature vector in the image feature vector set, the change-image feature vector comprising T variable image feature vectors of the target image obtained through a second neural network model, the second neural network model being obtained through training with a plurality of second sample images, and T being a positive integer,
determining, according to the instruction feature vector and the target image feature vector, an object feature vector matching the object identification information, and
recognizing the target object from the target image according to the object feature vector and the change-image feature vector.

8. The apparatus according to claim 7, wherein, when the processor is configured to cause the apparatus to recognize the target object from the target image according to the object feature vector and the change-image feature vector, the processor is configured to cause the apparatus to:
obtain a vector parameter of the object feature vector;
scale each variable image feature vector in the change-image feature vector according to the vector parameter, and perform a conversion operation on the scaled change-image feature vector, to obtain T intermediate image feature vectors;
input the object feature vector as an initial feature vector into a third neural network model, the third neural network model being obtained through training with a plurality of third sample images;
input the T intermediate image feature vectors sequentially into the third neural network model;
determine, according to an output result from the third neural network model, a target region that matches the object identification information and is in the target image; and
recognize the target object from the target region.

9. The apparatus according to claim 8, wherein, when the processor is configured to cause the apparatus to determine, according to the output result from the third neural network model, the target region, the processor is configured to cause the apparatus to:
obtain, according to the output result, a probability vector matching the target image, the probability vector comprising a $j^{th}$ probability element indicating a probability that a $j^{th}$ pixel location in the target image is in the target region, and j being a positive integer;
obtain at least one target probability element indicating a probability greater than a threshold from the probability vector; and
determine the target region according to at least one pixel location indicated by the at least one target probability element in the target image.

10. The apparatus according to claim 8, wherein, when the processor is configured to cause the apparatus to input the object feature vector as the initial feature vector into the third neural network model, the processor is configured to cause the apparatus to:
train the third neural network model according to the plurality of third sample images by:
obtaining a target value matching a training input value of the third neural network model and a training output value outputted by the third neural network model, and
adjusting the third neural network model according to the target value and the training output value by using a loss function.

11. The apparatus according to claim 7, wherein, when the processor is configured to cause the apparatus to determine, according to the instruction feature vector and the target image feature vector, the object feature vector matching the object identification information, the processor is configured to cause the apparatus to:
obtain a coordinate vector matching the target image;
splice the instruction feature vector, the target image feature vector, and the coordinate vector, to obtain a spliced feature vector; and
input the spliced feature vector into a fourth neural network model, to obtain the object feature vector, the fourth neural network model being obtained through training with a plurality of sample objects.

12. The apparatus according to claim 7, wherein, after the processor is configured to cause the apparatus to recognize the target object from the target image, the processor is configured to cause the apparatus to:
perform an image processing operation on the target object, the image processing operation comprising at least one of the following operations:
a cropping operation on the target object, or
an editing operation on the target object.

13. A non-transitory computer readable storage medium storing computer readable instructions, the computer readable instructions, when executed by a processor, causing the processor to perform:
obtaining an image recognition instruction, the image recognition instruction carrying object identification information used for indicating a target object in a target image;
obtaining an instruction feature vector matching the image recognition instruction;
obtaining an image feature vector set matching the target image, the image feature vector set comprising an $i^{th}$ image feature vector for indicating an image feature of the target image in an $i^{th}$ scale, and i being a positive integer; and recognizing the target object from the target image according to the instruction feature vector and the image feature vector set by:
  obtaining a target image feature vector in the image feature vector set, the target image feature vector indicating an image feature vector of the target image obtained through a first neural network model, and the first neural network model being obtained through training with a plurality of first sample images,
  obtaining a change-image feature vector in the image feature vector set, the change-image feature vector comprising T variable image feature vectors of the target image obtained through a second neural network model, the second neural network model being obtained through training with a plurality of second sample images, and T being a positive integer,
  determining, according to the instruction feature vector and the target image feature vector, an object feature vector matching the object identification information, and
  recognizing the target object from the target image according to the object feature vector and the change-image feature vector.

14. The non-transitory computer readable storage medium according to claim 13, wherein, when the computer readable instructions cause the processor to perform recognizing the target object from the target image according to the object feature vector and the change-image feature vector, the computer readable instructions cause the processor to perform:
  obtaining a vector parameter of the object feature vector;
  scaling each variable image feature vector in the change-image feature vector according to the vector parameter, and performing a conversion operation on the scaled change-image feature vector, to obtain T intermediate image feature vectors;
  inputting the object feature vector as an initial feature vector into a third neural network model, the third neural network model being obtained through training with a plurality of third sample images;
  inputting the T intermediate image feature vectors sequentially into the third neural network model;
  determining, according to an output result from the third neural network model, a target region that matches the object identification information and is in the target image; and
  recognizing the target object from the target region.

15. The non-transitory computer readable storage medium according to claim 14, wherein, when the computer readable instructions cause the processor to perform determining, according to the output result from the third neural network model, the target region, the computer readable instructions cause the processor to perform:
  obtaining, according to the output result, a probability vector matching the target image, the probability vector comprising a $j^{th}$ probability element indicating a probability that a $j^{th}$ pixel location in the target image is in the target region, and j being a positive integer;
  obtaining at least one target probability element indicating a probability greater than a threshold from the probability vector; and
  determining the target region according to at least one pixel location indicated by the at least one target probability element in the target image.

16. The non-transitory computer readable storage medium according to claim 14 wherein, before the computer readable instructions cause the processor to perform inputting the object feature vector as the initial feature vector into the third neural network model, the computer readable instructions further cause the processor to perform:
  training the third neural network model according to the plurality of third sample images by:
    obtaining a target value matching a training input value of the third neural network model and a training output value outputted by the third neural network model, and
    adjusting the third neural network model according to the target value and the training output value by using a loss function.

17. The non-transitory computer readable storage medium according to claim 13, wherein, when the computer readable instructions cause the processor to perform determining, according to the instruction feature vector and the target image feature vector, the object feature vector matching the object identification information, the computer readable instructions cause the processor to perform:
  obtaining a coordinate vector matching the target image;
  splicing the instruction feature vector, the target image feature vector, and the coordinate vector, to obtain a spliced feature vector; and
  inputting the spliced feature vector into a fourth neural network model, to obtain the object feature vector, the fourth neural network model being obtained through training with a plurality of sample objects.

* * * * *